(12) United States Patent
Searby

(10) Patent No.: US 7,677,811 B2
(45) Date of Patent: Mar. 16, 2010

(54) LIGHTPIPE MOUNTING ASSEMBLY AND METHOD

(75) Inventor: Tom J. Searby, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 617 days.

(21) Appl. No.: 10/922,001

(22) Filed: Aug. 19, 2004

(65) Prior Publication Data

US 2006/0039654 A1 Feb. 23, 2006

(51) Int. Cl.
*G02B 6/36* (2006.01)
(52) U.S. Cl. .............................. 385/53; 385/88; 385/92
(58) Field of Classification Search ............... 385/53, 385/139, 88, 92; 362/581
See application file for complete search history.

(56) References Cited

U.S. PATENT DOCUMENTS

| 5,327,328 | A | | 7/1994 | Simms et al. |
| 5,938,324 | A | | 8/1999 | Salmon et al. |
| 6,064,569 | A | | 5/2000 | Sands et al. |
| 6,129,440 | A | * | 10/2000 | Reynolds ............... 362/95 |
| 6,728,187 | B2 | | 4/2004 | Diaz et al. |
| 2002/0105230 | A1 | * | 8/2002 | Ziegler et al. ........... 307/64 |
| 2003/0169997 | A1 | * | 9/2003 | Hulse et al. ............. 385/146 |

* cited by examiner

*Primary Examiner*—Frank G Font
*Assistant Examiner*—Jerry Blevins

(57) ABSTRACT

A lightpipe mounting assembly comprises a panel having at least one opening extending from a front side of the panel to a rear side of the panel. The panel also comprises at least one hook extending rearwardly from a periphery of the opening. The mounting assembly also comprises a lightpipe adapted to engage the at least one hook to secure the lightpipe to the panel to enable visibility of the lightpipe from the front side of the panel.

20 Claims, 4 Drawing Sheets

LIGHTPIPE MOUNTING ASSEMBLY AND METHOD

BACKGROUND

Lightpipes are designed to transmit light from a source (e.g., a light emitting diode on a printed circuit board) to an outlet (e.g., an opening or interface on a computer panel). However, attaching or otherwise mounting lightpipes for such use remains a difficult task. For example, press-fit assembly methods are susceptible to vibrations and/or temperature variations, either of which tends to reduce or eliminate the frictional forces retaining the lightpipe. Additionally, snap-fit assembly methods require "undercuts" to be formed during the plastic injection mold process for forming a panel, thereby increasing the cost and complexity of the panel. Heat-staking the lightpipe to a panel also requires additional post-processing fixtures and heatstaking equipment. Further, using glues or adhesives to secure the lightpipe to the panel is also undesirable because of the difficulty associated with their use.

SUMMARY OF THE INVENTION

In accordance with one embodiment of the present invention, a lightpipe mounting assembly comprises a panel having at least one opening extending from a front side of the panel to a rear side of the panel where the panel has at least one hook extending rearwardly from a periphery of the opening. The assembly also comprises a lightpipe adapted to engage the at least one hook to secure the lightpipe to the panel to enable visibility of the lightpipe from the front side of the panel.

In accordance with another embodiment of the present invention, a lightpipe mounting method comprises providing a panel having an opening formed therein extending from a front side of the panel to a rear side of the panel where the panel has at least one hook extending rearwardly from a periphery of the opening. The method also comprises engaging a lightpipe with the at least one hook to secure the lightpipe to the panel to enable visibility of the lightpipe from the front side of the panel.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

The preferred embodiments of the present invention and the advantages thereof are best understood by referring to FIGS. 1-6 of the drawings, like numerals being used for like and corresponding parts of the various drawings.

Figure 1A:
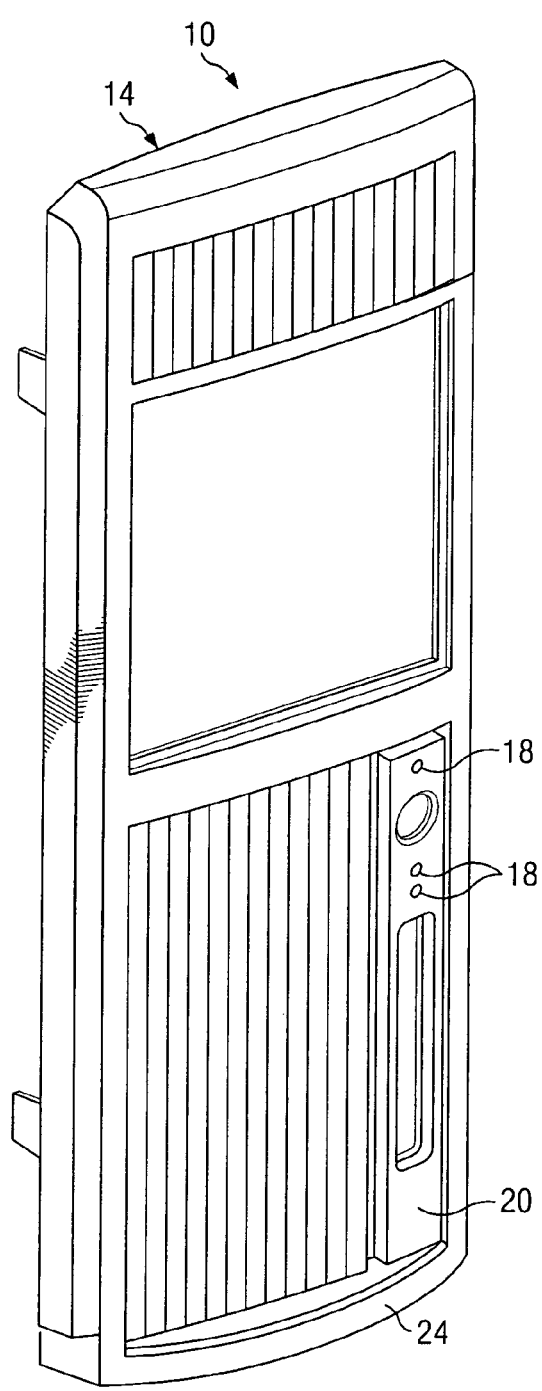
FIGS. 1A and 1B are diagrams illustrating front and rear views, respectively, of a computer panel in which an embodiment of a lightpipe mounting assembly in accordance with the present invention is implemented.
Figure 1B:
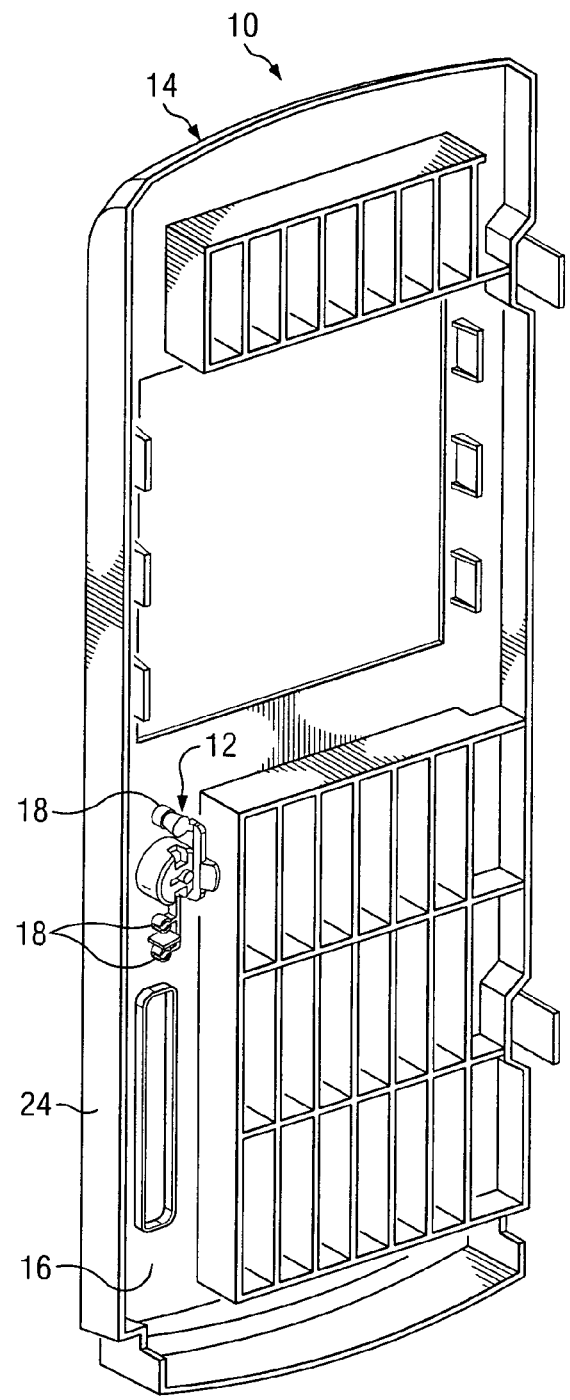

FIGS. 1A and 1B are diagrams illustrating front and rear views, respectively, of a lightpipe mounting assembly 10 in accordance with the present invention. In the embodiment illustrated in FIGS. 1A and 1B, assembly 10 comprises a lightpipe 12 coupled to a panel 14 to enable transmission of light via lightpipe 12 to an outlet or aperture in panel 14. For example, in the embodiment illustrated in FIGS. 1A and 1B, lightpipe 12 is coupled to a rear side 16 of panel 14 and extends into or otherwise cooperates with openings or apertures 18 in panel 14 to enable visibility of light from a front side 20 of panel 14 from a light source disposed rearwardly of panel 14 via lightpipe 12. Panel 14 may comprise any type of panel, enclosure, or other type of structure through which the transmission of light via lightpipe 12 is desired. For example, in the embodiment illustrated in FIGS. 1A and 1B, panel 14 comprises a front panel 24 of a computer housing. However, it should be understood that panel 14 may be disposed at other locations relative to a computer system and/or panel 14 may be associated with other types of assemblies or systems besides a computer. Additionally, in the embodiment illustrated in FIGS. 1A and 1B, three apertures 18 are illustrated in the panel 14 for receiving light via lightpipe 12. However, it should be understood that panel 14, and correspondingly light lightpipe 12, may be otherwise configured to provide a greater or fewer quantity of light locations.

Figure 2B:
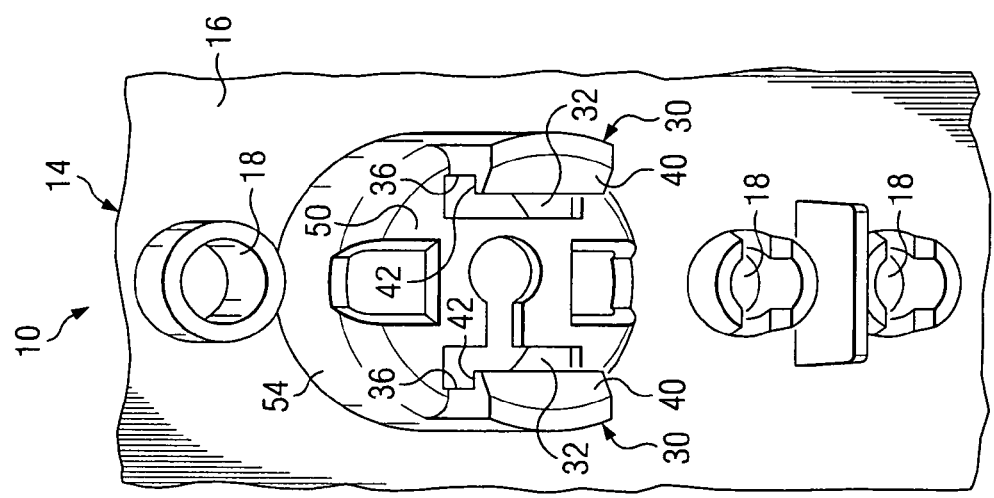
FIGS. 2A and 2B are diagrams illustrating front and rear views, respectively, of a computer panel in which the embodiment of the lightpipe mounting assembly of FIG. 1 is implemented in accordance with the present invention.
Figure 2A:
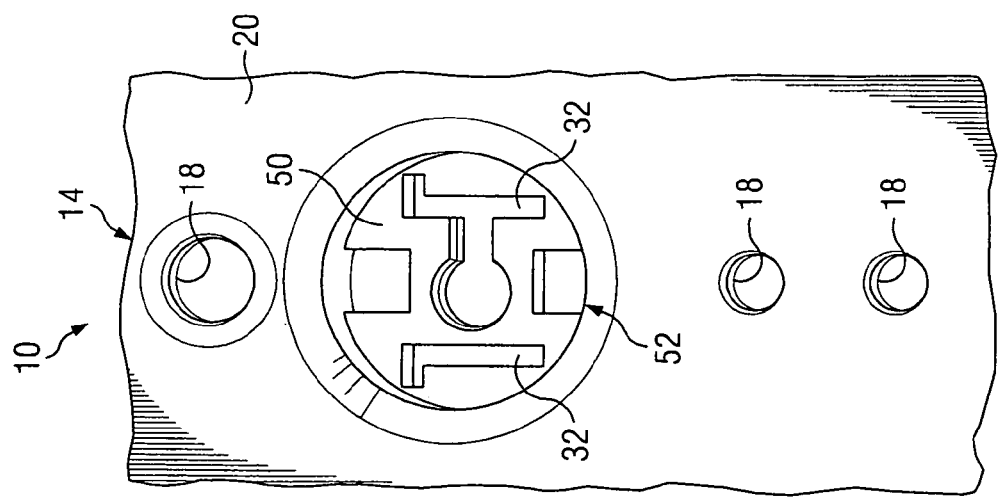

FIGS. 2A and 2B are diagrams illustrating front and rear views, respectively, of an embodiment of panel 14 corresponding to assembly 10 illustrated in FIGS. 1A and 1B. For example, FIG. 2A is a diagram illustrating an embodiment of front side 20 of panel 14 in accordance with the present invention, and FIG. 2B is a diagram illustrating an embodiment of rear side 16 of panel 14 in accordance with the present invention. In the embodiment illustrated in FIGS. 2A and 2B, panel 14 is formed having hooks 30 formed on rear side 16 of panel 14 to facilitate engagement of lightpipe 12 to panel 14. For example, in the embodiment illustrated in FIGS. 2A and 2B, openings 32 are formed in panel 14 through which a pass-core extends from a cavity side of a mold for forming panel 14 to a core side of the mold. The pass-core extends through openings 32 to form hooks 30, thereby alleviating a need for lifters in the mold for forming panel 14. In the embodiment illustrated in FIGS. 2A and 2B, two openings 32 and hooks 30 are illustrated. However, it should be understood that a greater or fewer quantity of openings 32 and hooks 30 may be used for attaching lightpipe to panel 14.

Thus, as illustrated in the embodiment of FIGS. 2A and 2B, each hook 30 extends rearwardly from a periphery 36 of opening 32 to form hook 30 facing rear side 16 of panel 14. For example, in the embodiment illustrated in FIGS. 2A and 2B, each hook 30 comprises a ramp portion 40 facing away from rear side 16 of panel 14 to form a hook tab portion 42 facing towards rear side 16 of panel 14. In the embodiment illustrated in FIGS. 2A and 2B, openings 32, and correspondingly hooks 30, are formed through a bottom wall 50 of a cavity 52 formed in panel 14. Cavity 52 may correspond to a button or other type of structure or element such that, after installation of a button or other type of structure or element into cavity 52, openings 32 are otherwise concealed from view from front side 20 of panel 14. Thus, in the embodiment illustrated in FIGS. 2A and 2B, each hook 30 extends rearwardly from, and contiguously thereto, a wall 54 of cavity 52.

Figure 3C:
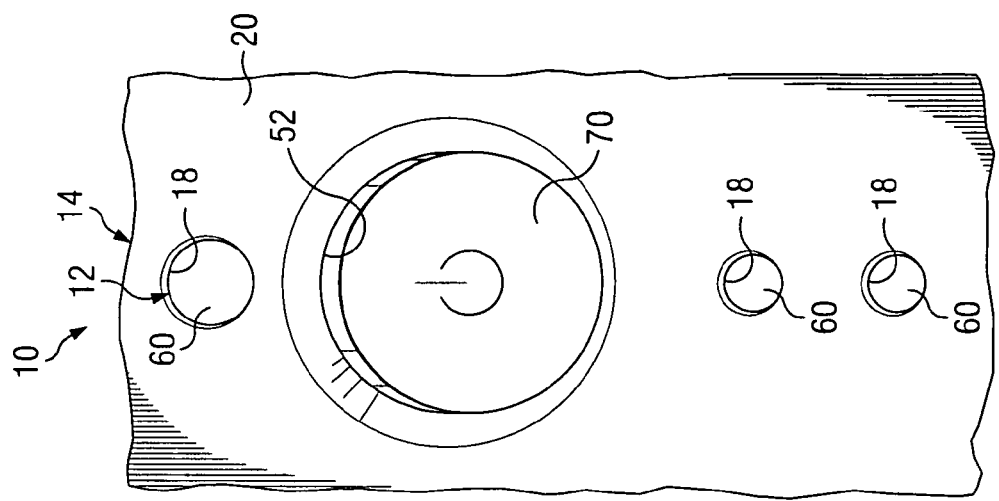
FIG. 3C is a diagram illustrating a front view of a computer panel having the lightpipe mounting assembly illustrated in FIGS. 3A and 3B installed thereto in accordance with the present invention.
Figure 3A:
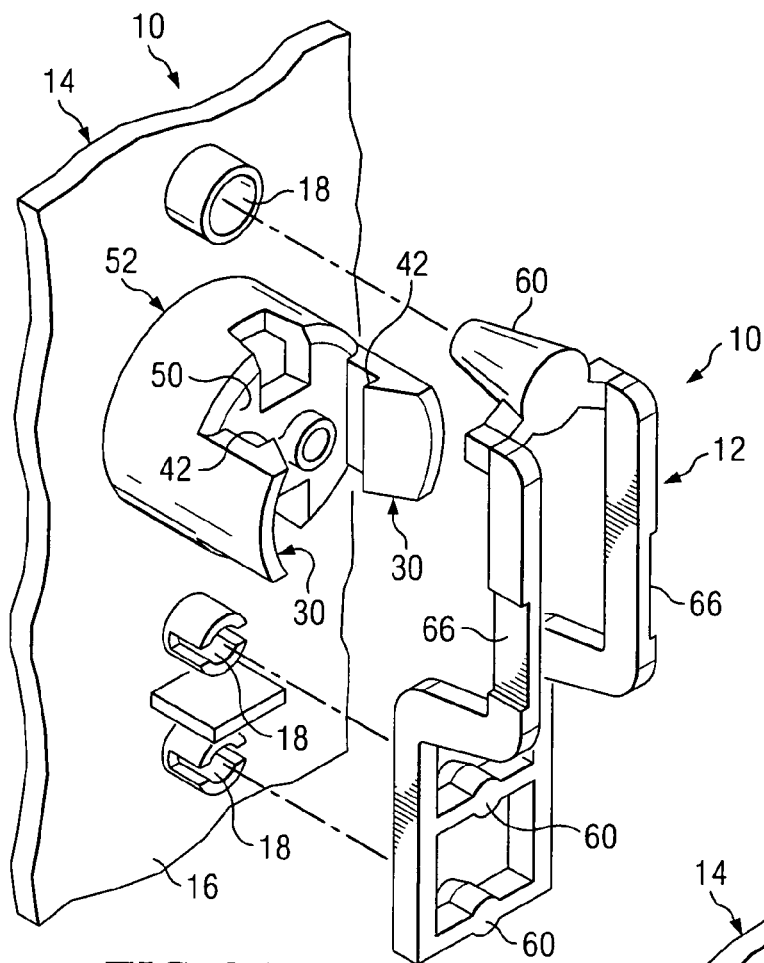
FIG. 3A is a diagram illustrating an exploded assembly view of an embodiment of a lightpipe mounting assembly in accordance with an embodiment of the present invention.
Figure 3B:
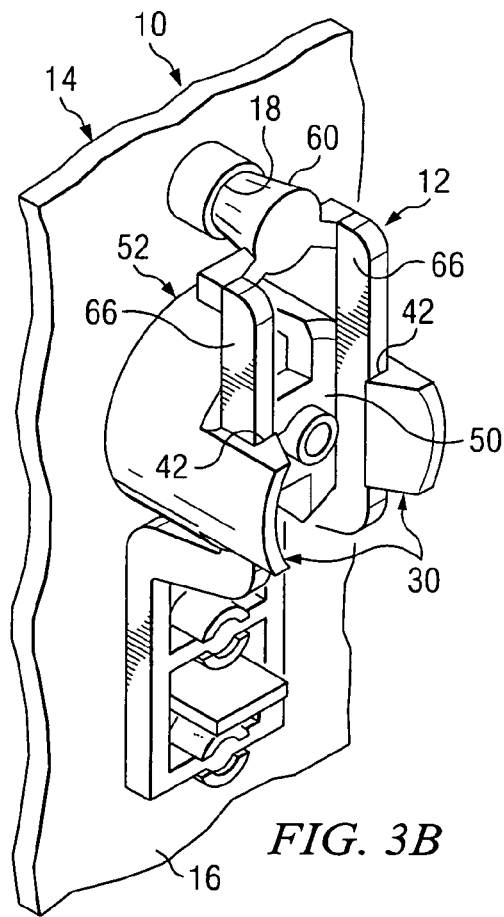
FIG. 3B is a diagram illustrating an assembled view of the lightpipe mounting assembly illustrated in FIG. 3A.

FIGS. 3A-3C are diagrams illustrating an embodiment of lightpipe 12 installation in accordance with the present invention using panel 14 illustrated in FIGS. 2A and 2B. For example, FIG. 3A is a diagram illustrating an exploded assembly view of assembly 10 in accordance with an embodiment of the present invention, FIG. 3B is a diagram illustrating panel 14 with lightpipe 12 installed, and FIG. 3C is a diagram illustrating front side 20 of panel 14 with lightpipe 12 installed and having a button installed onto panel 14, thereby effectively concealing openings 32 used to form hooks 30.

Referring to FIGS. 3A and 3B, lightpipe 12 is illustrated having three light emitters 60 adapted to cooperate with apertures 18 in panel 14 such that light emitted by light emitters 60 is visible via front side 20 of panel 14. In the embodiment illustrated in FIGS. 3A and 3B, lightpipe 12 comprises attachment members 66 adapted to cooperate with hooks 30 to secure lightpipe 12 to rear side 16 of panel 14. For example, in operation, lightpipe 12 is installed onto rear side 16 of panel 14 by aligning light emitters 60 with corresponding apertures 18 in panel 14 and engaging attachment members 66 with corresponding hooks 30 such that at least a portion of attachment members 66 are disposed between hook tab portion 42 of hook 30 and rear side 16 of panel 14 (e.g., between hook tab portion 42 of hook 30 and bottom wall 50 of a cavity 52). In some embodiments of the present invention, attachment members 66 of lightpipe 12 are configured having a sufficient level of flexibility to enable deflection of attachment members 66 to facilitate engagement of attachment members 66 to hooks 30 (e.g., attachment members 66 may be deflected inwardly toward each other to enable engagement of attachment members 66 with hooks 30). In other embodiments of the present invention, hooks 30 are configured having a sufficient level of flexibility such that hooks 30 may be deflected away from attachment members 66 during installation to facilitate engagement of attachment members 66 to hooks 30.

Referring to FIG. 3C, front side 20 of panel 14 is illustrated having lightpipe 12 attached to rear side 16 of panel 14 to facilitate visibility of light emitted by lightpipe 12 via light emitters 60. As illustrated in FIG. 3C, a button 70 is installed within cavity 52 to conceal openings 32 used to form hooks 30. Button 70 may comprise a power button or any other type of element, functional and/or cosmetic, to be disposed within cavity 52 to conceal openings 32 used to form hooks 30.

Figure 4:
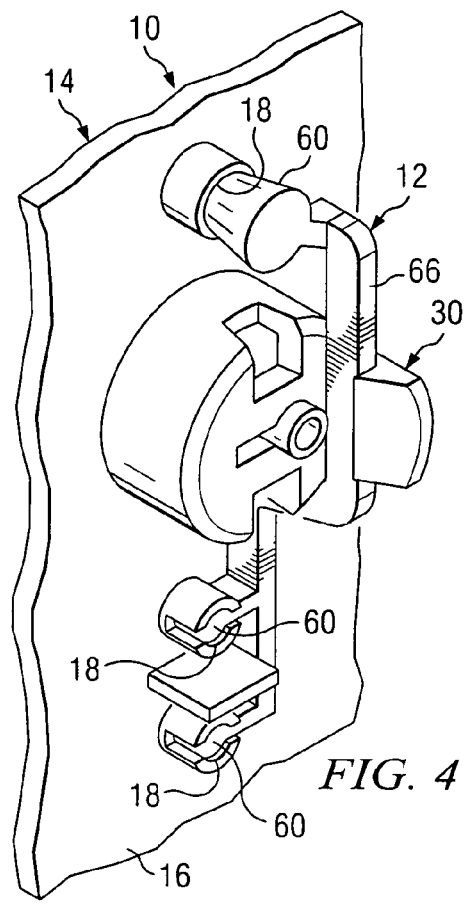
FIG. 4 is a diagram illustrating another embodiment of a lightpipe mounting assembly in accordance with the present invention.

FIG. 4 is a diagram illustrating another embodiment of lightpipe mounting assembly 10 in accordance with the present invention. In the embodiment illustrated in FIG. 4, panel 14 is formed having a single hook 30 for securing lightpipe 12 to rear side 16 of panel 14. In some embodiments of the present invention, multiple hooks 30 may be desired to secure lightpipe 12 to rear side 16 of panel 14. However, in other embodiments of the present invention, such as the embodiment illustrated in FIG. 4, cooperation of light emitters 60 with apertures 18 and attachment member 66 with a single hook 30 secure lightpipe 12 to rear side 16 of panel 14 while preventing rotation of lightpipe 12 relative to panel 14 or inadvertent disengagement of lightpipe 12 from panel 14.

Figure 5:
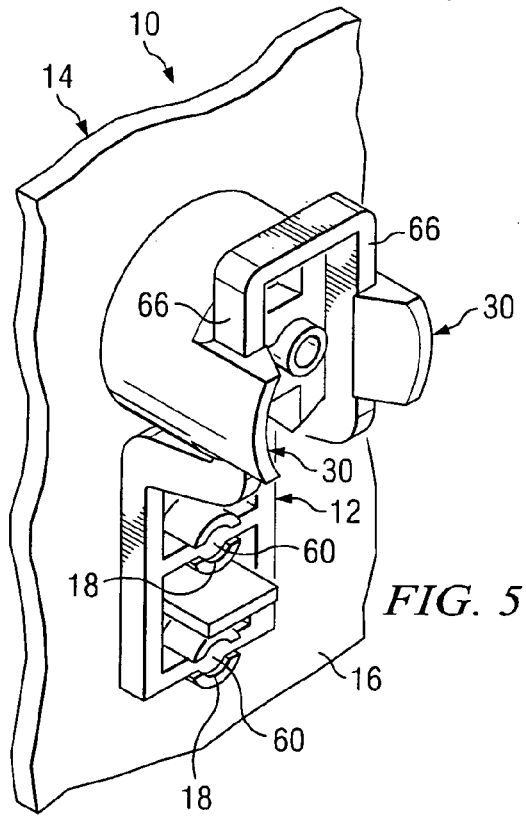
FIG. 5 is a diagram illustrating another embodiment of a lightpipe mounting assembly in accordance with the present invention.

FIG. 5 is a diagram illustrating another embodiment of lightpipe mounting assembly 10 in accordance with the present invention. In the embodiment illustrated in FIG. 5, panel 14 is formed having two hooks 30 for securing lightpipe 12 to rear side 16 of panel 14. Additionally, in the embodiment illustrated in FIG. 5, lightpipe 12 has light emitters 60 extending to a single side of hooks 30. Thus, it should be understood that assembly 10 may be configured having lightpipe 12 extending to single or multiple sides relative to hooks 30.

Figure 6:
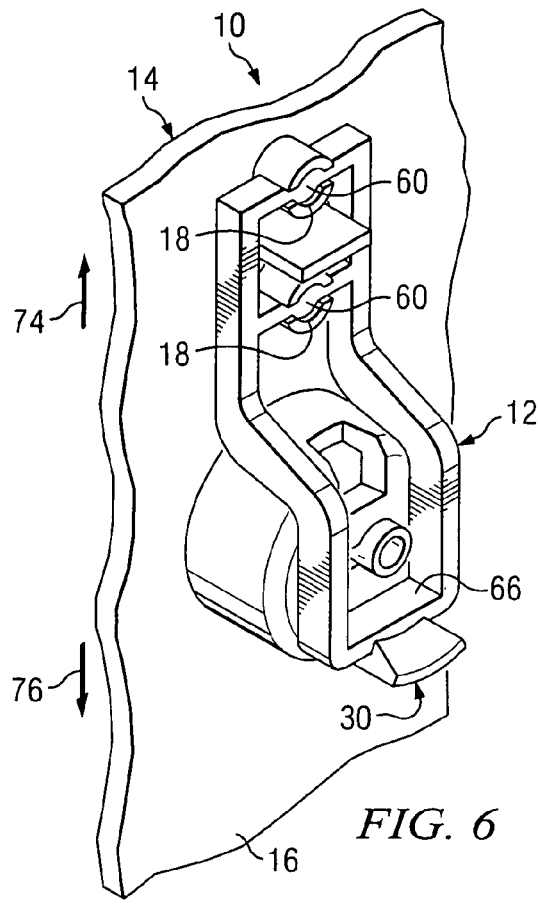
FIG. 6 is a diagram illustrating another embodiment of a lightpipe mounting assembly in accordance with the present invention.

FIG. 6 is a diagram illustrating another embodiment of lightpipe mounting assembly 10 in accordance with the present invention. In the embodiment illustrated in FIG. 6, panel 14 is configured having a single hook 30 disposed at an end of lightpipe 12 for securing lightpipe 12 to rear side 16 of panel 14. In the embodiment illustrated in FIG. 6, lightpipe 12 and/or panel 14 are configured to restrict movement of lightpipe 12 away from hook 30 to facilitate a secure attachment of lightpipe 12 to panel 14 via hook 30. For example, in the embodiment illustrated in FIG. 6, cooperation of light emitter(s) 60 with aperture(s) 18 in panel 14 prevent or restrict movement of lightpipe 12 in a direction indicated generally by 74, while cooperation of attachment member 66 with hook 30 prevents or restricts movement of lightpipe 12 in a direction indicated generally by 76, thereby securely attaching lightpipe 12 to panel 14 via hook 30.

Thus, embodiments of the present invention enable lightpipe attachment to a rear side of a panel or other type of structure via one or more hooks without requiring lifters or other types of mold tools for forming the hook(s). Therefore, embodiments of the present invention enable convenient and cost-effective lightpipe attachment and usage.

What is claimed is:

1. A lightpipe mounting assembly, comprising:
   a panel having at least one opening extending from a front side of the panel to a rear side of the panel, the panel having at least one hook extending rearwardly from a periphery of the opening;
   a lightpipe adapted to engage the at least one hook to secure the lightpipe to the panel to enable visibility of the lightpipe from the front side of the panel; and
   the lightpipe having a member adapted to deflect to facilitate engagement of the lightpipe with the at least one hook.

2. The assembly of claim 1, wherein the at least one opening extends through a button cavity formed in the panel.

3. The assembly of claim 1, wherein the at least one hook is formed contiguously to a button cavity formed in the panel.

4. The assembly of claim 1, the at least one hook facing the rear side of the panel.

5. The assembly of claim 1, the at least one hook having a ramp portion facing away from the rear side of the panel.

6. The assembly of claim 1, the lightpipe having a member adapted to be disposed between the at least one hook and the rear side of the panel.

7. The assembly of claim 1, the at least one opening extending through a bottom wall of a cavity formed in the panel.

8. The assembly of claim 1, the at least one hook extending rearwardly from a wall of a cavity formed in the panel.

9. A lightpipe mounting method, comprising:
   providing a panel having an opening formed therein extending from a front side of the panel to a rear side of the panel, the panel having at least one hook extending rearwardly from a periphery of the opening;
   engaging a lightpipe with the at least one hook to secure the lightpipe to the panel to enable visibility of the lightpipe from the front side of the panel; and
   wherein engaging a lightpipe comprises deflecting the at least one hook to facilitate engagement of the lightpipe with the at least one hook.

10. The method of claim 9, wherein providing a panel comprises providing a panel having the at least one opening extending through a button cavity formed in the panel.

11. The method of claim 9, wherein providing a panel comprises providing a panel having the at least one hook formed contiguously to a button cavity formed in the panel.

12. The method of claim 9, wherein providing a panel comprises providing a panel having the at least one hook facing the rear side of the panel.

13. The method of claim 9, wherein providing a panel comprises providing a panel having the at least one hook having a ramp portion facing away from the rear side of the panel.

14. The method of claim 9, wherein engaging a lightpipe comprises disposing at least a portion of the lightpipe between the at least one hook and the rear side of the panel.

15. The method of claim 9, wherein providing a panel comprises providing a panel having the at least one opening extending through a bottom wall of a cavity formed in the panel.

16. The method of claim 9, wherein providing a panel comprises providing a panel having the at least one hook extending rearwardly from a wall of a cavity formed in the panel.

17. A lightpipe mounting assembly, comprising:
    a panel having at least one opening extending from a front side of the panel to a rear side of the panel, the panel having at least one hook extending rearwardly from a periphery of the opening;
    a lightpipe adapted to engage the at least one hook to secure the lightpipe to the panel to enable visibility of the lightpipe from the front side of the panel; and
    the at least one hook configured to deflect to facilitate engagement of the lightpipe with the at least one hook.

18. The assembly of claim 17, wherein the at least one opening extends through a button cavity formed in the panel.

19. The assembly of claim 17, wherein the at least one hook is formed contiguously to a button cavity formed in the panel.

20. The assembly of claim 17, the at least one hook facing the rear side of the panel.

* * * * *